US012688558B2

(12) United States Patent
Yamane

(10) Patent No.: US 12,688,558 B2
(45) Date of Patent: Jul. 21, 2026

(54) SUBTRACTION IMAGE PROCESSING APPARATUS, SUBTRACTION IMAGE PROCESSING METHOD, AND NON-TRANSITORY STORAGE MEDIUM

(71) Applicant: CANON KABUSHIKI KAISHA, Tokyo (JP)

(72) Inventor: Toshimizu Yamane, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 304 days.

(21) Appl. No.: 18/175,566

(22) Filed: Feb. 28, 2023

(65) Prior Publication Data

US 2023/0281761 A1 Sep. 7, 2023

(30) Foreign Application Priority Data

Mar. 4, 2022 (JP) ................................ 2022-033246

(51) Int. Cl.
*G06T 5/70* (2024.01)
*G06T 5/50* (2006.01)
*G06T 7/00* (2017.01)

(52) U.S. Cl.
CPC .................. *G06T 5/70* (2024.01); *G06T 5/50* (2013.01); *G06T 7/0014* (2013.01);
(Continued)

(58) Field of Classification Search
CPC ........... G06T 5/70; G06T 5/50; G06T 7/0014; G06T 2207/20221; G06T 2207/20224;
(Continued)

(56) References Cited

U.S. PATENT DOCUMENTS 4,899,393 A * 2/1990 Morishita ................. G06T 5/80
382/130
2009/0074276 A1* 3/2009 Doi ...................... G06V 10/751
382/130
(Continued)

FOREIGN PATENT DOCUMENTS

EP 3236418 A2 * 10/2017 ........... G06T 11/003
EP 3236418 B1 10/2020
(Continued)

OTHER PUBLICATIONS

M. Eslami, S. Tabarestani, S. Albarqouni, E. Adeli, N. Navab and M. Adjouadi, "Image-to-Images Translation for Multi-Task Organ Segmentation and Bone Suppression in Chest X-Ray Radiography," in IEEE Transactions on Medical Imaging, vol. 39, No. 7, pp. 2553-2565, Jul. 2020, doi: 10.1109/TMI.2020.2974159 (Year: 2020).*
(Continued)

*Primary Examiner* — Bernard Krasnic

(74) *Attorney, Agent, or Firm* — Carter, DeLuca & Farrell LLP

(57) ABSTRACT

An image processing apparatus includes: an obtaining unit configured to obtain a first medical image and a second medical image collected from an object; an identification unit configured to identify a plurality of sites of the object included in the first medical image; and a subtraction image generation unit configured to generate a subtraction image between the first medical image and the second medical image by calculating, for each of a plurality of pixels forming the first medical image, a subtraction value with respect to a pixel, corresponding to the pixel, on the second medical image by a subtraction generation method corresponding to a site based on the result of the identification unit.

10 Claims, 9 Drawing Sheets

(52) U.S. Cl.
    CPC .............. *G06T 2207/20221* (2013.01); *G06T 2207/20224* (2013.01); *G06T 2207/30012* (2013.01)

(58) Field of Classification Search
    CPC . G06T 2207/30012; G06T 2207/10081; G06T 2207/30008; G06T 2207/30096; G06T 7/0016; G06T 7/0012
    See application file for complete search history.

(56)                References Cited

U.S. PATENT DOCUMENTS

| | | | |
|---|---|---|---|
| 2012/0121146 A1* | 5/2012 | Von Berg .................. | G06T 5/50 |
| | | | 382/128 |
| 2015/0235363 A1* | 8/2015 | Bar-Shalev .......... | A61B 6/5241 |
| | | | 382/131 |
| 2017/0091919 A1* | 3/2017 | Karino ................. | G06V 20/653 |
| 2022/0189017 A1* | 6/2022 | Wang ........................ | G06T 7/11 |

FOREIGN PATENT DOCUMENTS

| | | | | | |
|---|---|---|---|---|---|
| JP | 3569566 | B2 | * | 9/2004 | |
| JP | 2014158628 | A | * | 9/2014 | |
| JP | 2015150220 | A | | 8/2015 | |
| JP | 2017158781 | A | | 9/2017 | |
| JP | 2018-038815 | A | | 3/2018 | |
| JP | 2019115515 | A | * | 7/2019 | .......... G06T 3/0068 |
| JP | 2019201879 | A | | 11/2019 | |
| JP | 2020075078 | A | * | 5/2020 | .......... G06T 11/008 |
| JP | 6772123 | B2 | | 10/2020 | |
| JP | 6877109 | B2 | | 5/2021 | |

OTHER PUBLICATIONS

Extended European Search Report issued in EP Patent Application No. 23159834.3, dated May 15, 2023,, pp. 1-9.

Notice of Reasons for Refusal issued by the Japanese Patent Office on Mar. 4, 2026 in corresponding JP Patent Application No. 2022-033246, with English translation.

* cited by examiner

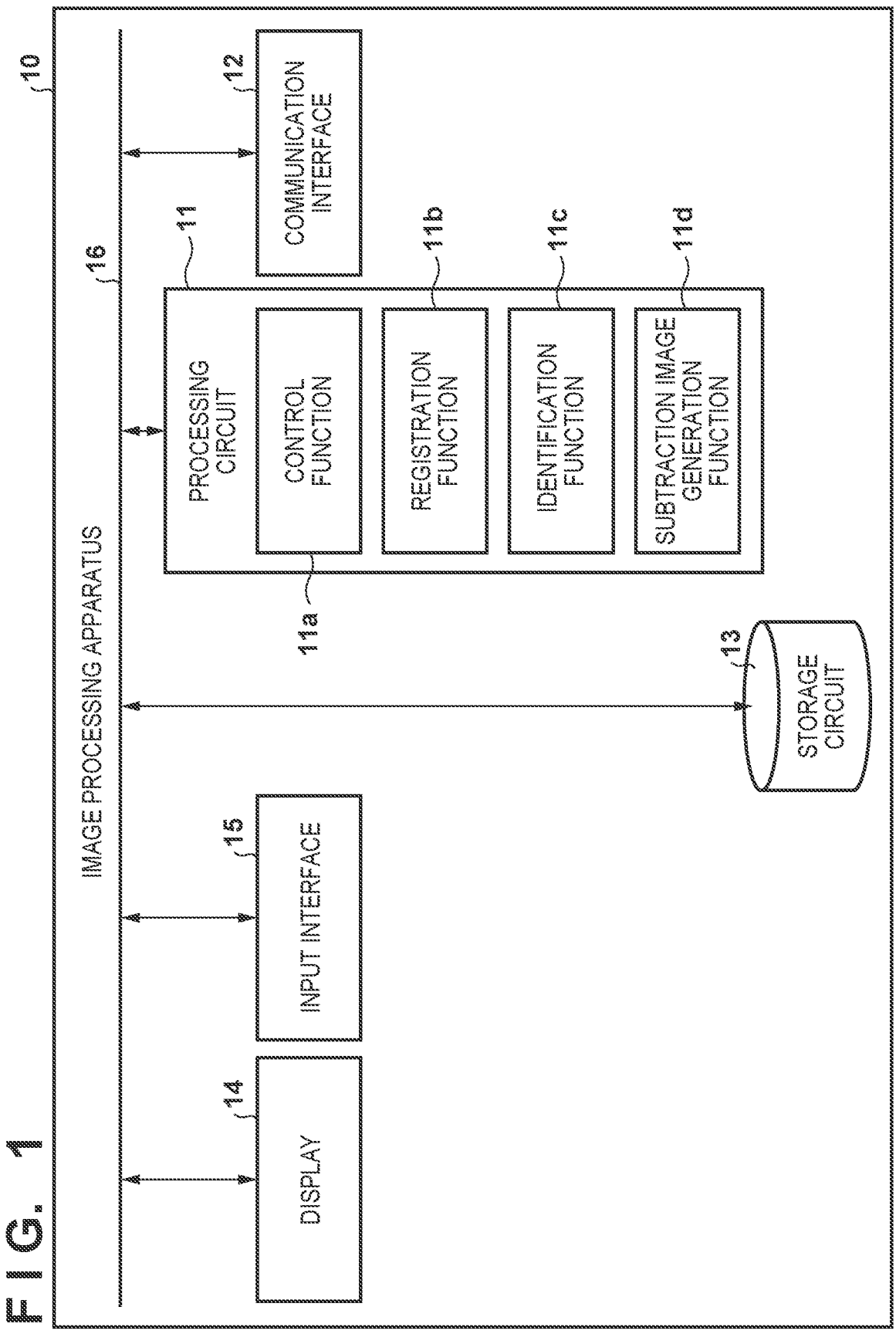
F I G. 1

F I G.  2
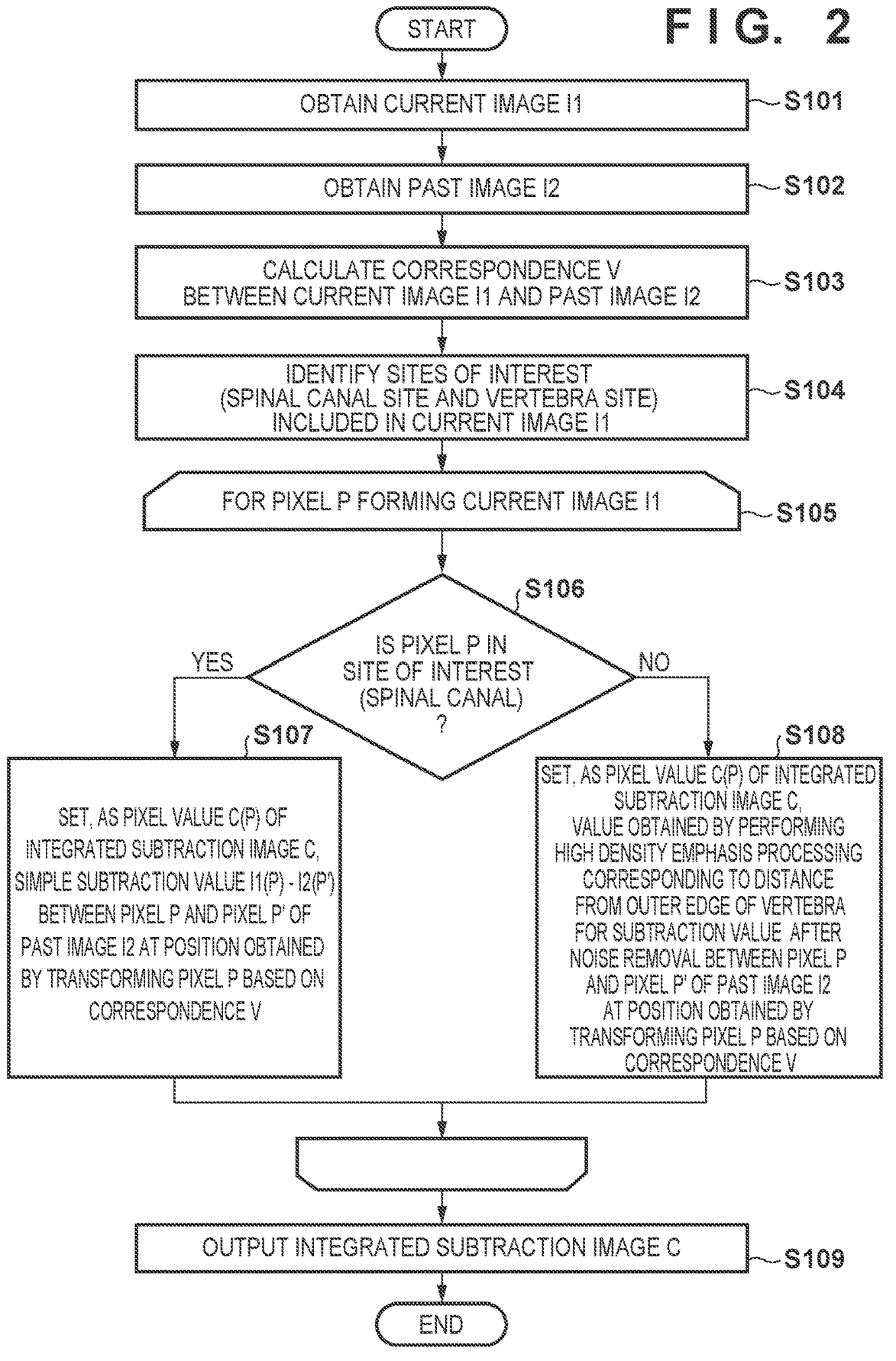

32    33    R    34

31

⊞ : 31:SPINAL CANAL

□ : 32:VERTEBRA

▨ : 33:PERIPHERY OF
       VERTEBRA

▦ : 34:REMAINING
       REGION

```
def Blend(r):

FUNCTION SUCH THAT
    RETURN VALUE APPROACHES 1 AS r APPROACHES -∞,
    RETURN VALUE APPROACHES 0 AS r APPROACHES +∞, AND
    RETURN VALUE SMOOTHLY CHANGES FROM 1 TO 0 AROUND R
```

F I G.  6A

HIGH DENSITY EMPHASIS SUBTRACTION FUNCTION

```
# thMin AND thMax ARE PARAMETERS
FOR CONTROLLING DEGREE OF HIGH DENSITY EMPHASIS def Clip(X,thMin):
    if X < thMin:
        return thMin:
    else:
        return X def Sub(I1, I2, thMin, thMax):
    CI1 = Clip(I1, thMin);    CI2 = Clip(I2, thMin)
    S = CI1 − CI2
    M = max(CI1, CI2)

# FUNCTION A(M, S) BELOW IS FUNCTION OF ATTENUATING VALUE OF
# S IN ACCORDANCE WITH VALUE OF M FROM thMin TO thMax,
# AND SMOOTHLY CHANGING RETURN VALUE FROM 0
TO ACTUAL VALUE OF S if M < thMin:
    return 0
elif M < thMax:
    return A(M, S)
else:
    return S
```

F I G.  6B
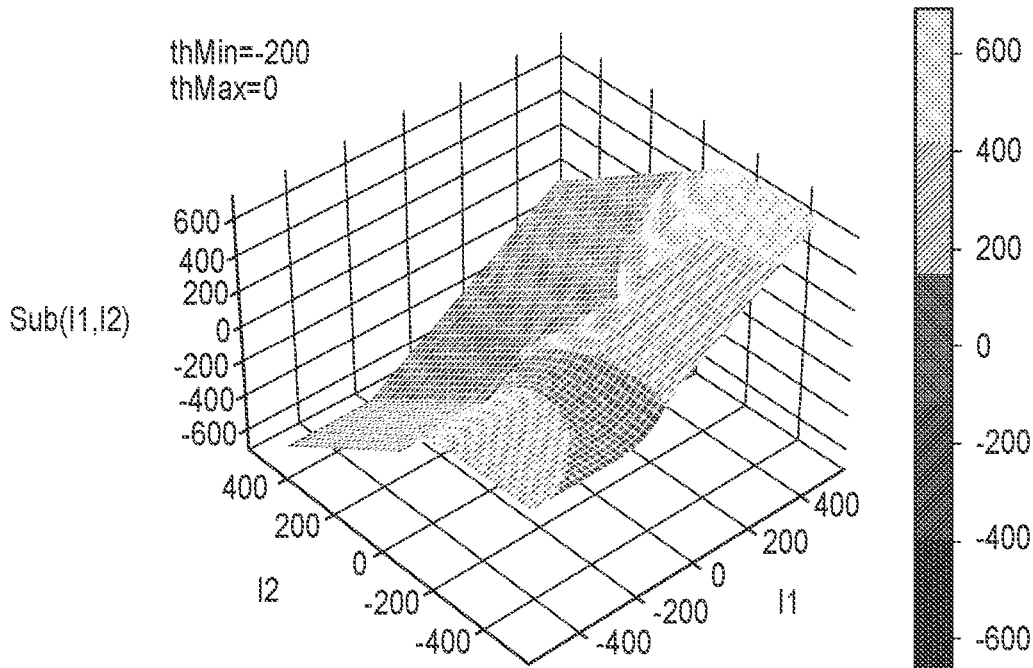
WEAK HIGH DENSITY EMPHASIS SUBTRACTION FUNCTION
F I G.  6C
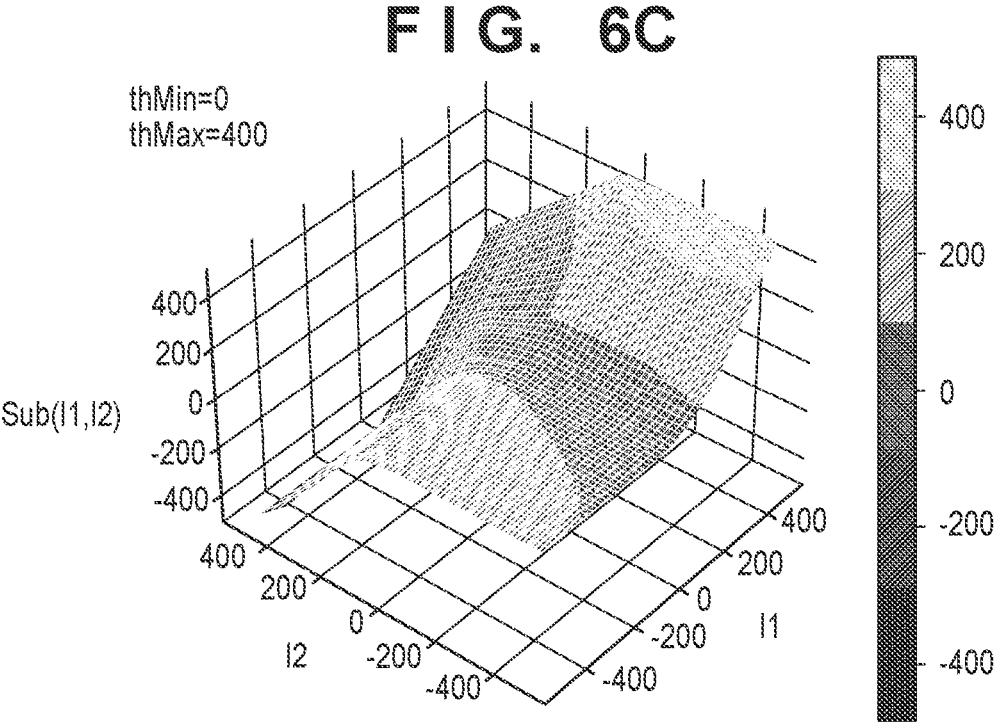
STRONG HIGH DENSITY EMPHASIS SUBTRACTION FUNCTION

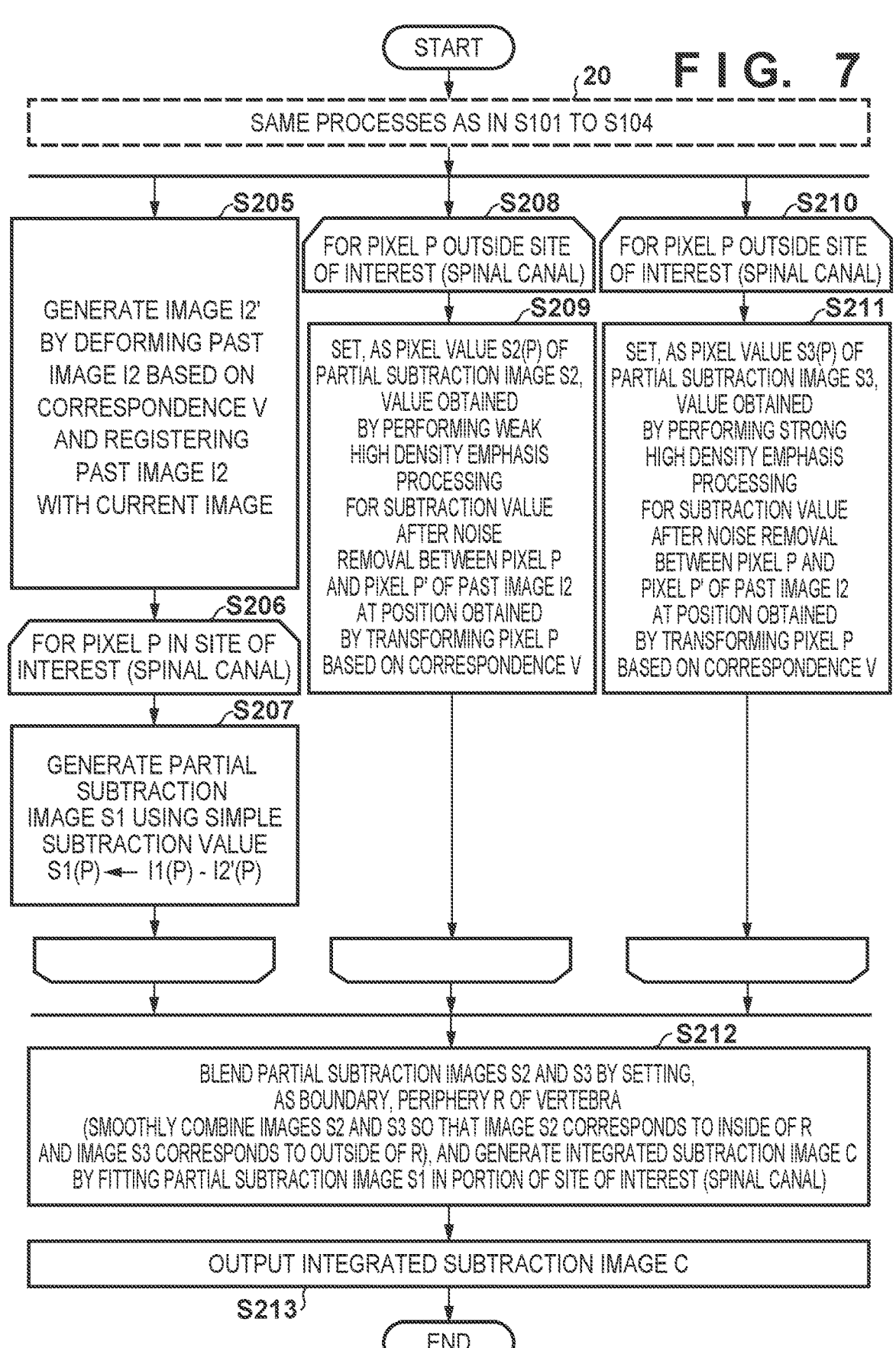

FIG. 7

START

S20  SAME PROCESSES AS IN S101 TO S104

S205  GENERATE IMAGE I2' BY DEFORMING PAST IMAGE I2 BASED ON CORRESPONDENCE V AND REGISTERING PAST IMAGE I2 WITH CURRENT IMAGE

S206  FOR PIXEL P IN SITE OF INTEREST (SPINAL CANAL)

S207  GENERATE PARTIAL SUBTRACTION IMAGE S1 USING SIMPLE SUBTRACTION VALUE S1(P) ← I1(P) - I2'(P)

S208  FOR PIXEL P OUTSIDE SITE OF INTEREST (SPINAL CANAL)

S209  SET, AS PIXEL VALUE S2(P) OF PARTIAL SUBTRACTION IMAGE S2, VALUE OBTAINED BY PERFORMING WEAK HIGH DENSITY EMPHASIS PROCESSING FOR SUBTRACTION VALUE AFTER NOISE REMOVAL BETWEEN PIXEL P AND PIXEL P' OF PAST IMAGE I2 AT POSITION OBTAINED BY TRANSFORMING PIXEL P BASED ON CORRESPONDENCE V

S210  FOR PIXEL P OUTSIDE SITE OF INTEREST (SPINAL CANAL)

S211  SET, AS PIXEL VALUE S3(P) OF PARTIAL SUBTRACTION IMAGE S3, VALUE OBTAINED BY PERFORMING STRONG HIGH DENSITY EMPHASIS PROCESSING FOR SUBTRACTION VALUE AFTER NOISE REMOVAL BETWEEN PIXEL P AND PIXEL P' OF PAST IMAGE I2 AT POSITION OBTAINED BY TRANSFORMING PIXEL P BASED ON CORRESPONDENCE V

S212  BLEND PARTIAL SUBTRACTION IMAGES S2 AND S3 BY SETTING, AS BOUNDARY, PERIPHERY R OF VERTEBRA (SMOOTHLY COMBINE IMAGES S2 AND S3 SO THAT IMAGE S2 CORRESPONDS TO INSIDE OF R AND IMAGE S3 CORRESPONDS TO OUTSIDE OF R), AND GENERATE INTEGRATED SUBTRACTION IMAGE C BY FITTING PARTIAL SUBTRACTION IMAGE S1 IN PORTION OF SITE OF INTEREST (SPINAL CANAL)

OUTPUT INTEGRATED SUBTRACTION IMAGE C

S213

END

F I G. 8
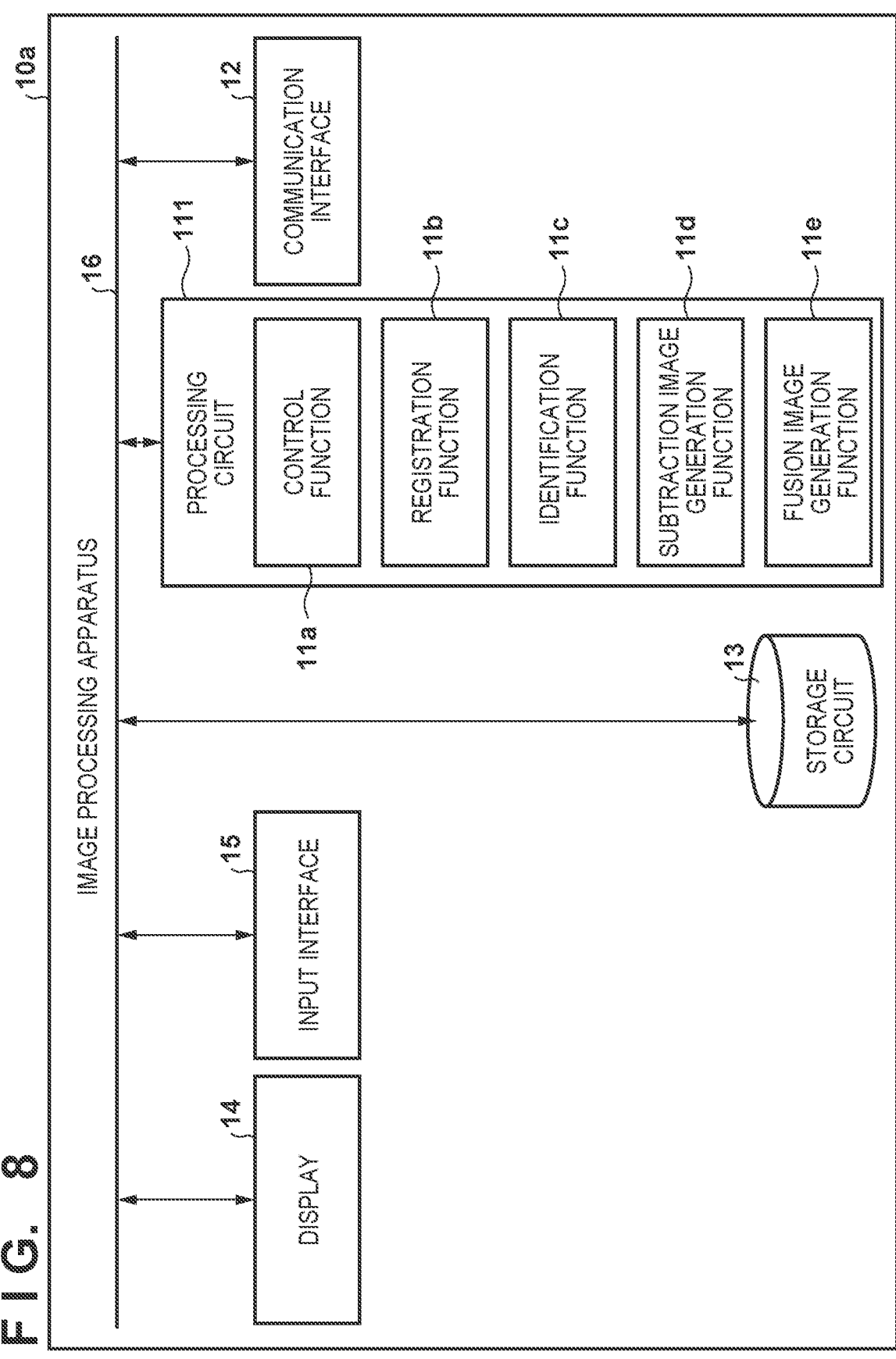

F I G. 9

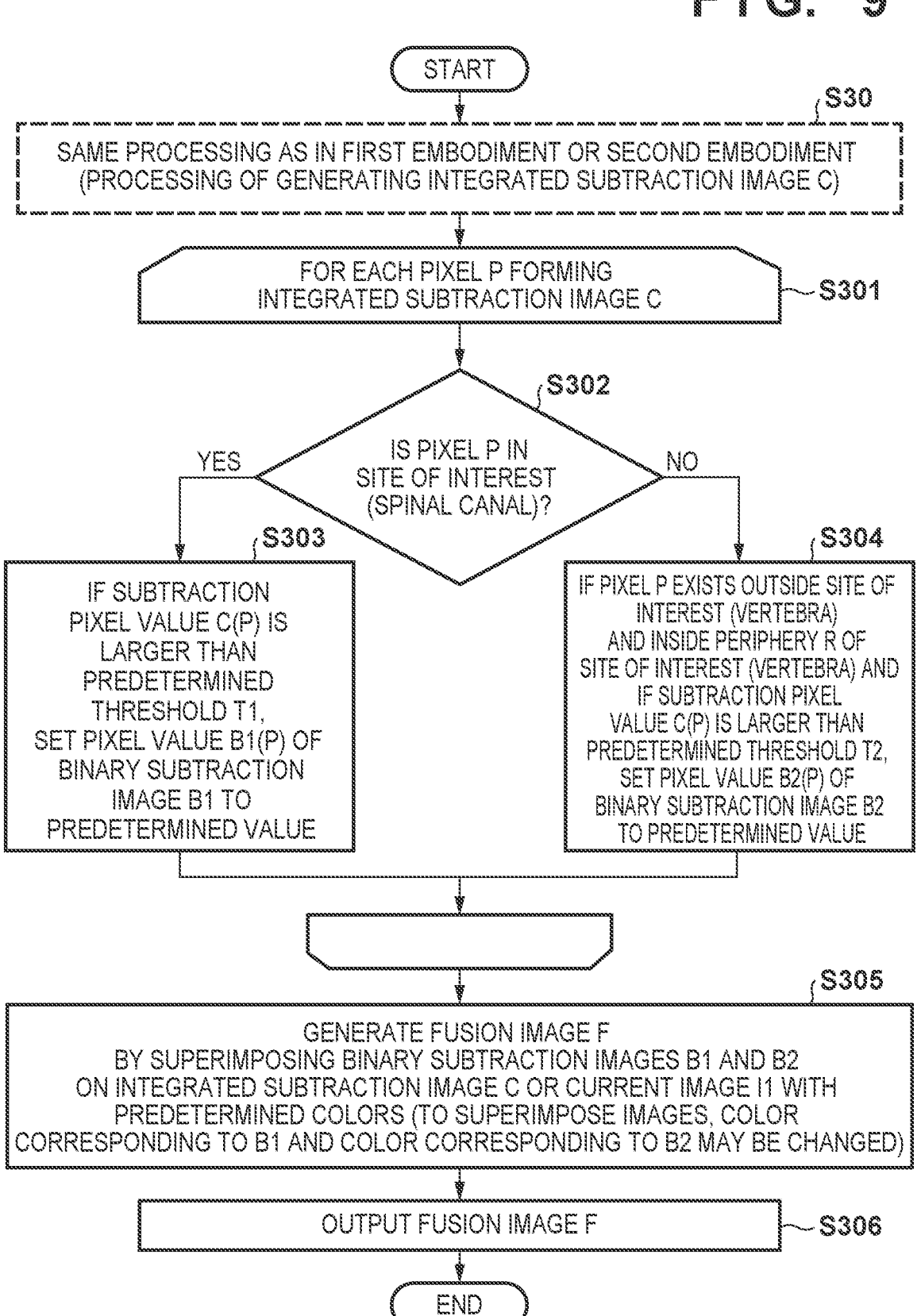

START

S30

SAME PROCESSING AS IN FIRST EMBODIMENT OR SECOND EMBODIMENT
(PROCESSING OF GENERATING INTEGRATED SUBTRACTION IMAGE C)

FOR EACH PIXEL P FORMING
INTEGRATED SUBTRACTION IMAGE C — S301

S302

IS PIXEL P IN
SITE OF INTEREST
(SPINAL CANAL)?

YES                                          NO

S303

IF SUBTRACTION
PIXEL VALUE C(P) IS
LARGER THAN
PREDETERMINED
THRESHOLD T1,
SET PIXEL VALUE B1(P) OF
BINARY SUBTRACTION
IMAGE B1 TO
PREDETERMINED VALUE

S304

IF PIXEL P EXISTS OUTSIDE SITE OF
INTEREST (VERTEBRA)
AND INSIDE PERIPHERY R OF
SITE OF INTEREST (VERTEBRA) AND
IF SUBTRACTION PIXEL
VALUE C(P) IS LARGER THAN
PREDETERMINED THRESHOLD T2,
SET PIXEL VALUE B2(P) OF
BINARY SUBTRACTION IMAGE B2
TO PREDETERMINED VALUE

S305

GENERATE FUSION IMAGE F
BY SUPERIMPOSING BINARY SUBTRACTION IMAGES B1 AND B2
ON INTEGRATED SUBTRACTION IMAGE C OR CURRENT IMAGE I1 WITH
PREDETERMINED COLORS (TO SUPERIMPOSE IMAGES, COLOR
CORRESPONDING TO B1 AND COLOR CORRESPONDING TO B2 MAY BE CHANGED)

OUTPUT FUSION IMAGE F — S306

END

SUBTRACTION IMAGE PROCESSING APPARATUS, SUBTRACTION IMAGE PROCESSING METHOD, AND NON-TRANSITORY STORAGE MEDIUM

BACKGROUND OF THE INVENTION

Field of the Invention

The embodiments disclosed in this specification and the accompanying drawings relate to an image processing apparatus, an image processing method, and a non-transitory storage medium.

Description of the Related Art

Conventionally, in the medical field, diagnosis has been performed using medical images collected by various medical image diagnosis apparatuses (modalities) such as a Computed Tomography apparatus (to be referred to as a CT apparatus hereinafter). To efficiently perform diagnosis, a technique of supporting diagnosis by a doctor by visualizing the temporal change of a lesion is required.

For example, to grasp the bone-related event risk of bone metastasis, a technique of visualizing tumor invasion of the spinal canal and measuring the degree of invasion is required. In addition, if invasion of the spinal canal occurs, an extraosseous mass often occurs on the periphery of a vertebra at the same time. Therefore, a technique of visualizing the extraosseous mass and observing the invasion of the spinal canal and the extraosseous mass together is required.

As a technique of visualizing the temporal change of a lesion, there is known, for example, an image subtraction technique of registering two images captured at different times and displaying a subtraction image that visualizes the difference between the images, thereby supporting comparison between the images.

For example, there is known a technique of switching subtraction generation processing depending on a site of interest in an image used to generate a subtraction image and creating a subtraction image with little noise. There is also known a technique of reducing noise caused by the partial volume effect in a subtraction image. Furthermore, there is known a technique concerning high density emphasis processing of attenuating a subtraction value of a soft tissue, which interferes with observation of a difference in a bone region, to be inconspicuous.

One of the problems that the embodiments disclosed in this specification and the accompanying drawings intend to solve is how to generate, even if an image includes a plurality of sites of interest, a subtraction image suitable for observing the plurality of sites of interest. However, the problems that the embodiments disclosed in this specification and the accompanying drawings intend to solve are not limited to the above problem. The problems corresponding to the effects of the respective arrangements disclosed in the embodiments described below can be regarded as other problems.

SUMMARY OF THE INVENTION

According to one aspect of the present invention, there is provided an image processing apparatus comprising: an obtaining unit configured to obtain a first medical image and a second medical image collected from an object; an identification unit configured to identify a plurality of sites of the object included in the first medical image; and a subtraction image generation unit configured to generate a subtraction image between the first medical image and the second medical image by calculating, for each of a plurality of pixels forming the first medical image, a subtraction value with respect to a pixel, corresponding to the pixel, on the second medical image by a subtraction generation method corresponding to a site based on the result of the identification unit.

According to another aspect of the present invention, there is provided an image processing method comprising: obtaining a first medical image and a second medical image collected from an object, and identifying a plurality of sites of the object included in the first medical image; and generating a subtraction image between the first medical image and the second medical image by calculating, for each of a plurality of pixels forming the first medical image, a subtraction value with respect to a pixel, corresponding to the pixel, on the second medical image by a subtraction generation method corresponding to a site based on the result of the identifying.

Further features of the present invention will become apparent from the following description of exemplary embodiments (with reference to the attached drawings).

BRIEF DESCRIPTION OF THE DRAWINGS

FIG. 1 is a block diagram showing an example of the arrangement of an image processing apparatus according to the first embodiment;

FIG. 2 is a flowchart illustrating all processes of the image processing apparatus according to the first embodiment;

FIG. 6A is a view showing a high density emphasis subtraction function according to the first embodiment;

FIG. 6B is a view showing a high density emphasis subtraction function according to the first embodiment;

FIG. 6C is a view showing a high density emphasis subtraction function according to the first embodiment;

FIG. 7 is a flowchart illustrating all processes of an image processing apparatus according to the second embodiment;

FIG. 8 is a block diagram showing an example of the arrangement of an image processing apparatus according to the third embodiment; and FIG. 9 is a flowchart illustrating all processes of an image processing apparatus according to the third embodiment.

DESCRIPTION OF THE EMBODIMENTS

Figures 3, 4:
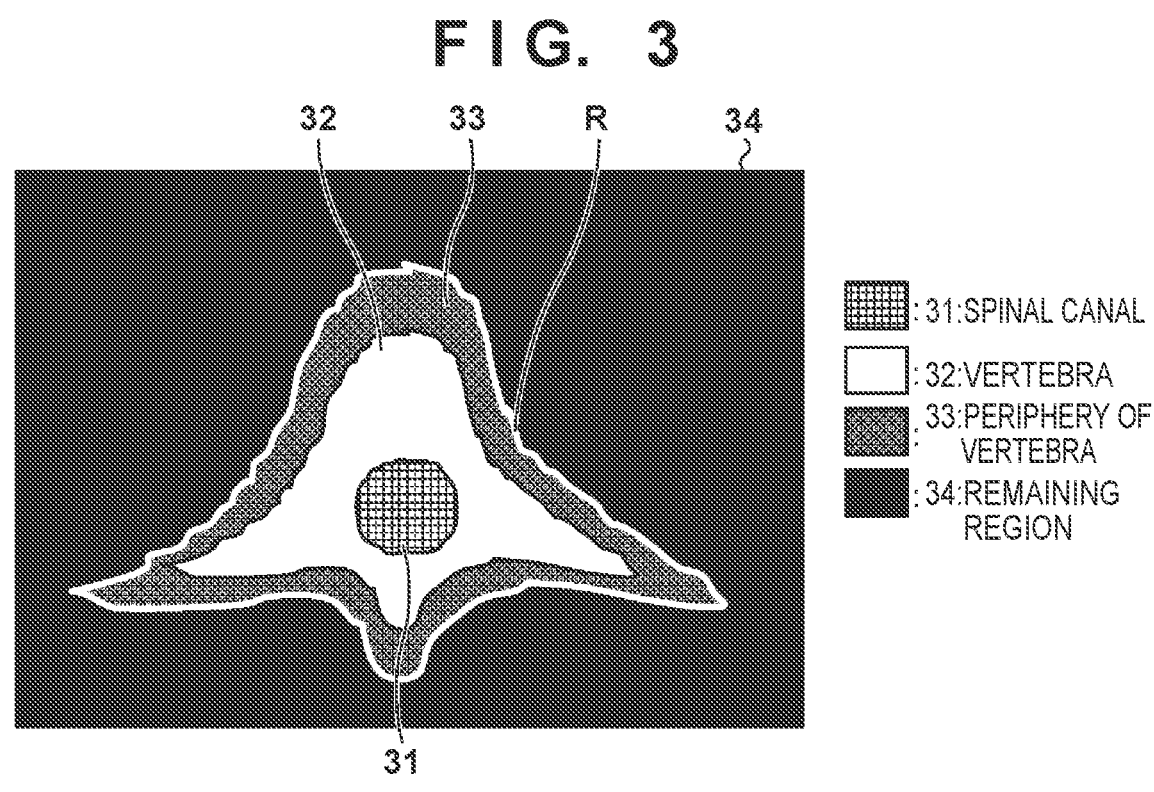
FIG. 3 is a view for explaining an example of identification processing of a site of interest according to the first embodiment.
FIG. 4 is a view showing a blend function according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

An image processing apparatus according to this embodiment deforms and registers a past image to a current image to generate a subtraction image (temporal subtraction image) representing a temporal change between the images. If a subtraction generation method applied to an entire image is decided in accordance with a site of interest, it may be impossible to generate a subtraction image suitable for observing a plurality of sites of interest in a case in which the image includes the plurality of sites of interest. To solve this problem, the image processing apparatus according to this embodiment identifies a plurality of sites included in a current image and applies a subtraction generation method corresponding to each site (suitable for each site), thereby making it possible to generate a subtraction image suitable for observing the plurality of sites of interest in a case in which the image includes the plurality of sites of interest.

This embodiment will describe details of an image processing apparatus by exemplifying diagnosis support of a bone metastasis-related event of a cancer. In this diagnosis support, bone metastasis, invasion of the spinal canal, and an extraosseous mass are diagnosis targets, and a subtraction image suitable for visualizing them in the same image is generated. Note that in this description, a spinal cord region in the spinal canal will be referred to as a spinal canal region hereinafter.

As described above, the image processing apparatus according to this embodiment generates a subtraction image. However, in raw subtraction (to be referred to as simple subtraction hereinafter) of simply subtracting a CT value of a current image from a CT value of a past image (after registration), noise occurs due to the partial volume effect. Thus, the image processing apparatus according to this embodiment applies a noise reduction method disclosed in patent literature 2 (Japanese Patent Laid-Open No. 2018-38815) or the like. However, since the noise reduction processing unwantedly removes a small subtraction value together with noise, if the noise reduction processing is applied in the spinal canal region, a small subtraction value in the spinal canal may be eliminated. To cope with this, the image processing apparatus according to this embodiment calculates raw subtraction (simple subtraction) for the entire pixel value region in the spinal canal region, and calculates subtraction outside the spinal canal region using the noise reduction method disclosed in patent literature 2.

Outside the spinal canal region, the image processing apparatus according to this embodiment applies, in addition to the noise reduction method, high density emphasis processing disclosed in patent literature 3 (Japanese Patent No. 6877109) for attenuating a subtraction value on a low absorber such as lungs while keeping a subtraction value on a high absorber such as a bone. Since the high density emphasis processing unwantedly eliminates a subtraction value on the periphery of a vertebral body necessary to visualize an extraosseous mass, the image processing apparatus according to this embodiment applies processing of weakening the degree of high density emphasis to a vertebra or a site close to a vertebra.

FIG. 1 is a block diagram showing an example of the arrangement of an image processing apparatus 10 according to the first embodiment. As shown in FIG. 1, the image processing apparatus 10 includes a processing circuit 11, a communication interface 12, a storage circuit 13, a display 14, an input interface 15, and a connection portion 16. The image processing apparatus 10 is communicably connected to a medical image diagnosis apparatus (modality), a medical image saving apparatus, each department system, and the like via a network (not shown).

The medical image diagnosis apparatus includes an X-ray Computed Tomography (CT) apparatus, a Magnetic Resonance Imaging (Mill) apparatus, and an X-ray diagnosis apparatus. The medical image saving apparatus is implemented by a Picture Archiving and Communication System (PACS) or the like, and saves a medical image in a format complying with Digital Imaging and Communication Medicine (DICOM). The department systems include various systems such as a Hospital Information System (HIS), a Radiology Information System (RIS), a diagnosis report system, and a Laboratory Information System (LIS).

The processing circuit 11 controls the image processing apparatus 10 by executing a control function 11a, a registration function 11b, an identification function 11c, and a subtraction image generation function 11d in accordance with an input operation accepted from a user via the input interface 15. The control function 11a is an example of an obtaining unit. The registration function 11b is an example of a registration unit. The identification function 11c is an example of an identification unit. The subtraction image generation function 11d is an example of a subtraction image generation unit.

In accordance with operations via the input interface 15, the control function 11a executes control to generate various Graphical User Interfaces (GUIs) or various kinds of display information and display them on the display 14. The control function 11a controls transmission/reception of information to/from an apparatus or a system on the network (not shown) via the communication interface 12. More specifically, the control function 11a obtains three-dimensional medical images (volume data) from the modality, the medical image saving apparatus, or the like connected to the network. The control function 11a obtains information concerning an object from each department system connected to the network. Furthermore, the control function 11a outputs a processing result to the apparatus or system on the network.

For example, the control function 11a obtains a first medical image and a second medical image collected from an object. Note that processing by the control function 11a will be described in detail later.

The registration function 11b executes registration processing for, as a target, the three-dimensional medical image obtained by the control function 11a. More specifically, the registration function 11b calculates the correspondence between each pixel of the first medical image and each pixel of the second medical image. Note that processing by the registration function 11b will be described in detail later.

The identification function 11c identifies a plurality of sites of the object with respect to, as a target, the three-dimensional medical image obtained by the control function 11a. More specifically, the identification function 11c identifies a plurality of sites of the object included in the first medical image. Note that processing by the identification function 11c will be described in detail later.

The subtraction image generation function 11d generates a subtraction image between the first medical image and the second medical image. More specifically, the subtraction image generation function 11d calculates, for each of a plurality of pixels forming the first medical image, a subtraction value with respect to a pixel, corresponding to the pixel, on the second medical image by a subtraction generation method corresponding to the site, thereby generating a subtraction image between the first medical image and the second medical image. Note that processing by the subtraction image generation function 11d will be described in detail later.

The above-described processing circuit 11 is implemented by, for example, a processor. In this case, each of the above-described processing functions is stored in the storage circuit 13 in the form of a program executable by a computer. The processing circuit 11 implements a function corresponding to each program by reading out the program stored in the storage circuit 13 and executing it. In other words, the processing circuit 11 has each processing function shown in FIG. 1 in a state in which each program is read out.

Note that the processing circuit 11 may be formed by combining a plurality of independent processors, and each processor may implement each processing function by executing the program. The processing functions of the processing circuit 11 may be implemented by appropriately distributing or integrating these to a single or a plurality of processing circuits. The processing functions of the processing circuit 11 may be implemented by a combination of software and hardware such as a circuit. An example in a case in which the programs corresponding to the processing functions are stored in the single storage circuit 13 has been explained but the embodiment is not limited to this. For example, the programs corresponding to the processing functions may be distributively stored in a plurality of storage circuits, and the processing circuit 11 may be configured to read out the programs from the storage circuits, respectively, and execute them.

The communication interface 12 controls transmission and communication of various data transmitted/received between the image processing apparatus 10 and another apparatus or system connected via the network. More specifically, the communication interface 12 is connected to the processing circuit 11, and outputs data received from another apparatus or system to the processing circuit 11 or transmits, to another apparatus or system, data output from the processing circuit 11. For example, the communication interface 12 is implemented by a network card, a network adapter, a Network Interface Controller (NIC), or the like.

The storage circuit 13 stores various data and various programs. More specifically, the storage circuit 13 is connected to the processing circuit 11, and stores data input from the processing circuit 11 or reads out stored data and outputs it to the processing circuit 11. For example, the storage circuit 13 is implemented by a Random Access Memory (RAM), a semiconductor memory device such as a flash memory, a hard disk, an optical disk, or the like.

The display 14 displays various kinds of information and various data. More specifically, the display 14 is connected to the processing circuit 11, and displays various kinds of information and various data output from the processing circuit 11. For example, the display 14 is implemented by a liquid crystal display, a Cathode Ray Tube (CRT) display, an organic EL display, a plasma display, a touch panel, or the like.

The input interface 15 accepts input operations of various instructions and various kinds of information from the user. More specifically, the input interface 15 is connected to the processing circuit 11, and converts an input operation received from the user into an electrical signal and outputs it to the processing circuit 11. For example, the input interface 15 is implemented by a track ball, a switch button, a mouse, a keyboard, a touchpad on which an input operation is performed by touching an operation surface, a touch screen formed by integrating a display screen and a touch pad, a noncontact input interface using an optical sensor, an audio input interface, or the like. Note that in this specification, the input interface 15 is not limited to a physical operation part such as a mouse or a keyboard. For example, an electrical signal processing circuit for receiving an electrical signal corresponding to an input operation from an external input device provided separately from the apparatus and outputting the electrical signal to a control circuit is also an example of the input interface 15.

The connection portion 16 is a bus or the like that connects the processing circuit 11, the communication interface 12, the storage circuit 13, the display 14, and the input interface 15.

FIG. 2 is a flowchart illustrating all processes of the image processing apparatus 10 according to the first embodiment. The image processing apparatus 10 inputs a current image as the first medical image and a past image as the second medical image, and outputs an integrated subtraction image as a subtraction image between the current image and the past image, which has been calculated for each site by a suitable subtraction generation method. Each medical image is three-dimensional volume data. This embodiment assumes that the first medical image and the second medical image are X-ray CT images. However, the embodiment is not limited to this, and this method is also applicable to a medical image of another modality such as a Magnetic Resource Imaging (MRI) image. The first medical image and the second medical image may be another combination of images other than the current image and the past image. For example, a contrast image and a non-contrast image which are captured by one inspection operation may be used.

For example, as shown in FIG. 2, in this embodiment, the control function 11$a$ obtains a latest X-ray CT image of a given object as a current image I1 which is the first medical image (step S101). Next, the control function 11$a$ obtains, as a past image I2 which is the second medical image, an X-ray CT image collected by a preceding imaging operation of the same object (step S102). This processing is implemented when, for example, the processing circuit 11 calls the program corresponding to the control function 11$a$ from the storage circuit 13 and executes it.

Next, the registration function 11$b$ calculates (estimates) a correspondence V between the position of each pixel of the current image I1 and the position of each pixel of the past image I2 (step S103). That is, the registration function 11$b$ deforms and registers the current image I1 and the past image I2 so that each pixel of the past image I2 matches the corresponding pixel of the current image I1. In other words, the registration function 11$b$ estimates deformation between the current image I1 and the past image I2. This processing is implemented when, for example, the processing circuit 11 calls the program corresponding to the registration function 11$b$ from the storage circuit 13 and executes it.

Next, the identification function 11$c$ identifies sites of interest in the current image I1 (step S104). In this embodiment, the identification function 11$c$ identifies, as sites of interest, a spinal canal site and a vertebra site. This processing is implemented when, for example, the processing circuit 11 calls the program corresponding to the identification function 11$c$ from the storage circuit 13 and executes it.

Next, the subtraction image generation function 11$d$ determines, for each pixel P forming the current image I1, whether the pixel P exists in the site of interest (spinal canal) (step S106), and executes processing in step S107 or S108 in accordance with a determination result (step S105). This processing is executed for, for example, all the pixels forming the current image I1. If, for example, the pixel P exists in the site of interest (that is, the pixel P belongs to the spinal canal) (YES in step S106), the subtraction image generation function 11$d$ sets, as a pixel value C(P) of an integrated subtraction image C, a simple subtraction value "I1(P)-I2(P')" between the pixel P and a pixel P' of the past image 12 at a position obtained by transforming the pixel P based on the correspondence V (step S107).

On the other hand, if the pixel P does not exist in the site of interest (that is, the pixel P does not belong to the spinal canal) (NO in step S106), the subtraction image generation function 11*d* sets, as the pixel value C(P) of the integrated subtraction image C, a value obtained by performing high density emphasis processing corresponding to the distance from the outer edge of the vertebra for the subtraction value after noise removal between the pixel P and the pixel P' of the past image 12 at the position obtained by transforming the pixel P based on the correspondence V (step S108). This processing is implemented when, for example, the processing circuit 11 calls the program corresponding to the subtraction image generation function 11*d* from the storage circuit 13 and executes it.

Next, the subtraction image generation function 11*d* outputs the integrated subtraction image C (step S109). For example, the subtraction image generation function 11*d* outputs the integrated subtraction image C to the storage circuit 13 or another apparatus on the network. This processing is implemented when, for example, the processing circuit 11 calls the program corresponding to the subtraction image generation function 11*d* from the storage circuit 13 and executes it.

Details of each process executed by the image processing apparatus 10 will be described below.

(Medical Image Obtaining Processing)

As described above with reference to steps S101 and S102 of FIG. 2, the control function 11*a* obtains the current image I1 and the past image 12 in accordance with a volume data obtaining operation via the input interface 15. The control function 11*a* can obtain the current image I1 and the past image 12 from images saved in the storage circuit 13 or images saved in another apparatus on the network.

In step S102, the control function 11*a* can obtain, as the past image 12, an image other than an image collected by the preceding imaging operation. For example, the control function 11*a* can obtain, as the past image 12, an image collected by an imaging operation before the preceding imaging operation.

The control function 11*a* can obtain, as the past image 12 (second medical image), a medical image collected from the object before bone metastasis. In this case, the control function 11*a* specifies the hospitalization date of the object from an electronic medical record included in the HIS, and obtains, from the PACS or the like, an X-ray CT image of the imaging date close to the specified date as an image before bone metastasis. Alternatively, the control function 11*a* specifies an X-ray CT image before bone metastasis by executing bone metastasis determination processing using machine learning or the like for X-ray CT images for respective periods, which have been collected from the object, thereby obtaining the specified X-ray CT image as the past image 12.

Note that in step S102, information can be searched from an electronic medical record by using Health Level 7 (HL7) or by directly issuing an SQL statement to an electronic medical record database. Furthermore, an image can be obtained from the PACS by using the DICOM protocol.

The control function 11*a* can obtain, as a past image, an X-ray CT image extracted under another condition or an X-ray CT image manually selected by the user. Similarly, the control function 11*a* can obtain, as a current image, an X-ray CT image selected by an arbitrary method.

(Registration Processing)

As described above with reference to step S103 of FIG. 2, the registration function 11*b* calculates (estimates) the correspondence V between the position of each pixel of the current image I1 and the position of each pixel of the past image 12. At this time, the registration function 11*b* can calculate (estimate) the correspondence V using an existing linear registration algorithm, an existing nonlinear registration algorithm, or a combination thereof. The registration function 11*b* can perform registration between a feature point indicating a feature site included in the current image I1 and a feature point indicating a feature site included in the past image 12 by deforming and registering the images, as described above.

(Identification Processing of Site of Interest)

As described above with reference to step S104 of FIG. 2, the identification function 11*c* identifies sites of interest included in the current image I1. More specifically, the identification function 11*c* identifies a site in which at least one of the composition and pixel value range is different. For example, the identification function 11*c* identifies a site of interest included in the current image by using an existing identification algorithm using a morphological operation, machine learning, or the like.

FIG. 3 is a view for explaining an example of the identification processing of the site of interest according to the first embodiment. Note that the processing will be described using a two-dimensional slice image with reference to FIG. 3. However, in fact, the identification function 11*c* extracts a three-dimensional site of interest in volume data. For example, as shown in FIG. 3, the identification function 11*c* identifies a spinal canal 31, a vertebra 32, a periphery 33 of the vertebra, and a remaining region 34 in the current image I1. Note that the periphery 33 of the vertebra is defined as a region of a range having a width Rmm extending outward from the outer edge of the vertebra 32.

For example, the identification function 11*c* identifies the spinal canal 31 and the vertebra 32 in the current image I1 using an arbitrary identification algorithm. Then, the identification function 11*c* identifies, as the periphery 33 of the vertebra, the range having the width Rmm extending outward from the outer edge of the vertebra 32. Furthermore, the identification function 11*c* identifies a region other than the spinal canal 31, the vertebra 32, and the periphery 33 of the vertebra as the remaining region 34 in the current image I1. Note that the width Rmm defining the periphery 33 of the vertebra can be set to an arbitrary numerical value.

(Subtraction Image Generation Processing)

As described above with reference to steps S105 to S109 of FIG. 2, the subtraction image generation function 11*d* generates the integrated subtraction image C by a different subtraction generation method in accordance with whether the pixel P is included in the site of interest (spinal canal). More specifically, the subtraction image generation function 11*d* generates a subtraction image by applying, in accordance with the site, a first subtraction generation method formed from subtraction processing or a second subtraction generation method formed from subtraction processing in which the degree of at least one of noise reduction processing and emphasis processing is higher than that of the first subtraction generation method.

For example, the subtraction image generation function 11*d* applies the first subtraction generation method to a pixel corresponding to the inside of the spinal canal, and applies the second subtraction generation method to a pixel corresponding to the outside of the spinal canal. As the first subtraction generation method applied to the pixel P included in the spinal canal 31, the subtraction image generation function 11*d* executes simple subtraction processing between a pixel value of the first medical image (current image I1) and a pixel value of the second medical image (past image 12).

That is, the subtraction image generation function 11*d* calculates the subtraction value between the pixel P belonging to the spinal canal and the corresponding pixel P' by simple subtraction "I1(P)-I2(P')", and sets the calculated subtraction value as the pixel value C(P) of the integrated subtraction image C. In this example, the corresponding pixel P' is a pixel of the past image 12 at the position obtained by transforming the pixel P based on the correspondence V. Note that as the first subtraction generation method, a subtraction generation method other than simple subtraction may be used. For example, a subtraction value may be generated after performing noise reduction using the median filter or the like for each image.

As the second subtraction generation method applied to the pixel P included in a region (the vertebra 32, the periphery 33 of the vertebra, and the remaining region 34) other than the spinal canal 31, the subtraction image generation function 11*d* executes subtraction processing including as least one of noise reduction processing and emphasis processing. For example, the subtraction image generation function 11*d* calculates the subtraction value using a noise reduction method with respect to the pixel P included in the vertebra 32, the periphery 33 of the vertebra, and the remaining region 34, and executes, for the calculated subtraction value, processing of performing high density emphasis processing corresponding to the distance from the outer edge of the vertebra 32. Then, the subtraction image generation function 11*d* sets the obtained subtraction value as the pixel value C(P) of the integrated subtraction image C.

In this example, the noise reduction method executed for the pixel P included in the region other than the spinal canal 31 is formed by noise reduction processing with a degree higher than that of noise reduction processing (the median filter or the like) applicable to the first subtraction generation method. For example, as the noise reduction method executed for the pixel P included in the region other than the spinal canal 31, the method described in patent literature 2 or the like that aims to reduce artifact caused by the partial volume effect is used. Note that as the noise reduction method executed for the pixel P included in the region other than the spinal canal 31, arbitrary noise reduction processing is applicable as long as the degree of the noise reduction processing is higher than that of the noise reduction processing applicable to the first subtraction generation method.

The high density emphasis processing executed for the subtraction value is processing of relatively emphasizing a subtraction value of a region (for example, a bone region) which has high density in one of the current image I1 and the past image 12, and for example, the method described in patent literature 3 can be used.

Next, the high density emphasis processing corresponding to the distance from the outer edge of the vertebra will be described. The high density emphasis processing corresponding to the distance from the outer edge of the vertebra is high density emphasis processing with a degree that is changed in accordance with the distance from the outer edge of the vertebra as the boundary between the vertebra 32 and the periphery 33 of the vertebra, as shown in FIG. 3. The distance is a distance on an object coordinate system. For example, the high density emphasis processing corresponding to the distance from the outer edge of the vertebra is processing of generating, for the vertebra 32 and the periphery 33 of the vertebra, a subtraction image with weak high density emphasis (high density emphasis with a relatively low degree of emphasizing high density), and generating, for the remaining region 34, a subtraction image with strong high density emphasis (high density emphasis with the a relatively high degree of emphasizing high density).

Figure 5:
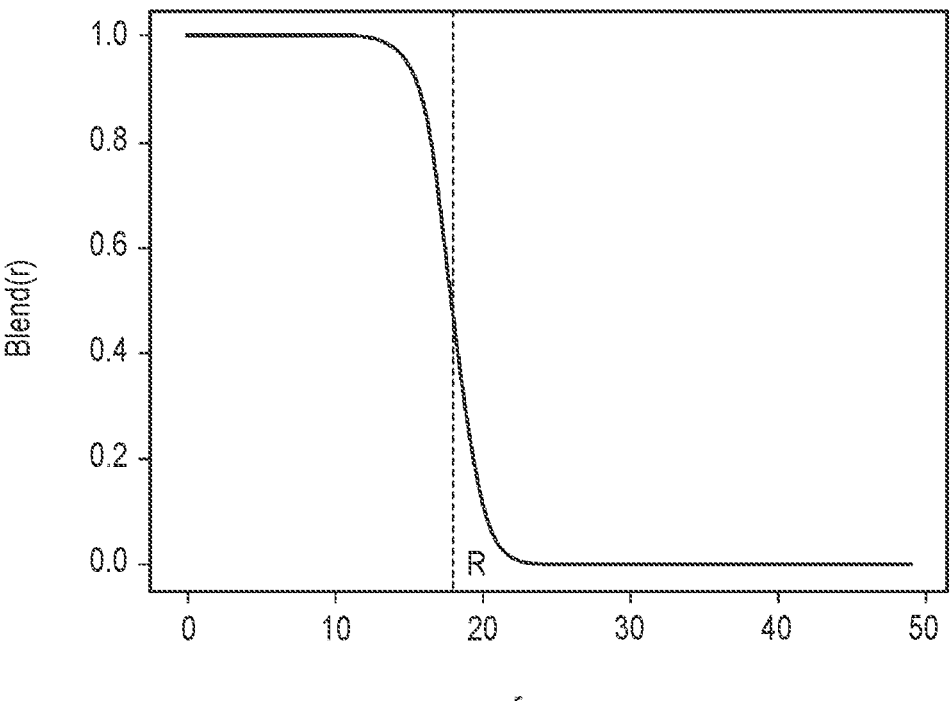
FIG. 5 is a graph showing the blend function according to the first embodiment.

In this embodiment, the subtraction image generation function 11*d* also performs processing of smoothly combining two subtraction images using a blend function Blend(r) shown in FIGS. 4 and 5 near a boundary R between the periphery 33 of the vertebra and the remaining region 34. Note that FIGS. 4 and 5 are views showing the blend function according to the first embodiment. FIG. 5 is a graph of the blend function according to the first embodiment. In this example, FIG. 5 shows a graph in a case in which the boundary R between the periphery 33 of the vertebra and the remaining region 34 is set at a position of a distance "18 mm" from the outer edge of the vertebra.

That is, the subtraction image generation function 11*d* executes blend processing of the subtraction values using "a function such that a return value approaches 1 as r approaches −∞, the return value approaches 0 as r approaches ∞, and the return value smoothly changes from 1 to 0 around R" where "r" represents the distance from the outer edge of the vertebra. This can smoothly change the degree of blend around the boundary R (=18), as shown in FIG. 5.

For example, if S2($r$) represents a pixel value of the subtraction image generated with weak high density emphasis, and S3($r$) represents a pixel value of the subtraction image generated with strong high density emphasis, the subtraction image generation function 11*d* calculates a pixel value C(r) of an integrated subtraction image blended at the boundary R by C(r)=S2($r$)×Blend(r)+S3($r$)×(1−Blend(r)). That is, the subtraction image generation function 11*d* generates a subtraction image having undergone weak high density emphasis processing and a subtraction image having undergone strong high density emphasis processing to partially overlap each other around the boundary R, and generates the integrated subtraction image C by blending the generated two subtraction images at the boundary R.

Thus, the subtraction image generation function 11*d* performs weak high density emphasis processing for the vertebra 32 and the periphery 33 of the vertebra such that the degree of high density emphasis is gradually higher outward around the boundary R, and generates the integrated subtraction image C having undergone the strong high density emphasis processing for the remaining region 34.

The function of calculating the subtraction value with high density emphasis can change, using parameters thMin and thMax for controlling the degree of high density emphasis, the range of the CT value to which the processing is applied. For example, the subtraction image generation function 11*d* calculates the subtraction value based on a high density emphasis subtraction function shown in FIG. 6A. The parameters thMin and thMax are parameters used to set the CT value to which the high density emphasis processing is applied.

For example, as indicated by a function Sub in FIG. 6A, the high density emphasis subtraction function includes an image "CI1" obtained by clipping the pixel values of the current image I1 by the threshold thMin, an image "CI2" obtained by clipping the pixel values of the past image 12 by the threshold thMin, a subtraction image "S" having a pixel value obtained by subtracting a pixel value of the image "CI2" from a pixel value of the image "CI1", an image "M"

having a pixel value which is a larger one of a pixel value of "CI1" and a pixel value of "CI2", and a function "A" of attenuating each pixel value of the subtraction image "S" in accordance with a value of "M" (the shape of an array returned by the function is the same as that of the image).

Then, for each pixel, the high density emphasis subtraction function gives, as a return value, "0", "A(M, S)", or "S" in accordance with a result of comparison between the value of "M" and the thresholds thMin and thMax. Note that "A(M, S)" is a function that is defined for "M" from the threshold thMin to the threshold thMax, and that attenuates the value of "S" in accordance with the value of "M" (as "M" decreases, "S" also decreases) to smoothly change the return value of the function Sub from "0" to the value of "S". For example, $A(M, S)=W(M) \times S$ can be defined. $W(M)$ represents a function of providing a degree of attenuating the subtraction value, and the value of $W(M)$ is decided by M. Furthermore, $W(M)$ can be defined by an arbitrary function such that as the value of M gradually changes from the threshold thMin to the threshold thMax, the return value changes from 0 to 1. This can attenuate the subtraction value of a low density pixel.

The thresholds thMin and thMax can appropriately be set in accordance with the site. For example, if the subtraction image between the current image I1 and the past image I2 is generated in the region of the vertebra 32 and the periphery 33 of the vertebra shown in FIG. 3, a weak high density emphasis subtraction function shown in FIG. 6B is used. That is, in this case, the high density emphasis subtraction function relatively weakens the degree of high density emphasis, and thus relatively small thresholds are set, as compared with a strong high density emphasis subtraction function to be described later. For example, "thMin=−200" and "thMax=0" are set.

Furthermore, for example, if the subtraction image between the current image I1 and the past image I2 is generated in the region of the remaining region 34 shown in FIG. 3, a strong high density emphasis subtraction function shown in FIG. 6C is used. That is, in this case, the high density emphasis subtraction function relatively strengthens the degree of high density emphasis, and thus relatively large thresholds are set, as compared with the weak high density emphasis subtraction function. For example, "thMin=0" and "thMax=400" are set.

With the above processing, it is possible to visualize invasion of the spinal canal by calculating raw subtraction for the entire pixel value region in the spinal canal 31. In the vertebra 32 or a site close to it, it is possible to visualize an extraosseous mass by calculating, by the weak high density emphasis subtraction function, subtraction for a wide pixel value range including a difference in a soft tissue. On the other hand, in the remaining region 34 away from the vertebra 32, it is possible to visualize bone metastasis by attenuating a subtraction value of a region other than bones by the strong high density emphasis subtraction function.

Note that the subtraction image generation function 11$d$ applies the second subtraction generation method to a pixel included outside the spinal canal. In the second subtraction generation method as well, the degree of high density emphasis processing is changed among the vertebra 32, the periphery 33 of the vertebra, and the remaining region 34. Therefore, the subtraction generation method of the vertebra 32 and the periphery 33 of the vertebra can be regarded as the first subtraction generation method, and the subtraction generation method of the remaining region 34 can be regarded as the second subtraction generation method. That is, the subtraction image generation function 11$d$ applies the first subtraction generation method to a pixel corresponding to the vertebra region excluding the inside of the spinal canal or the peripheral region of the vertebra, and applies the second subtraction generation method to a pixel outside the vertebra region including the inside of the spinal canal and the peripheral region of the vertebra. At this time, the first subtraction generation method is subtraction processing including high density emphasis processing of attenuating a subtraction value of a relatively low pixel value region, and the second subtraction generation method is subtraction processing including high density emphasis processing of strengthening the degree of attenuating the subtraction value, as compared with the first subtraction generation method. As described above, this embodiment adopts an arrangement in which emphasis processing (strong high density emphasis processing) with a degree higher than that of emphasis processing (weak high density emphasis processing) used in the first subtraction generation method is used as the second subtraction generation method.

As described above, the subtraction image generation function 11$d$ generates the integrated subtraction image C, and then outputs the generated integrated subtraction image C to the storage circuit 13 or another apparatus on the network. Note that the subtraction image generation function 11$d$ can implement transmission of the integrated subtraction image C to the PACS using the DICOM protocol. Furthermore, the control function 11$a$ can display the generated integrated subtraction image C on the display 14.

As described above, according to the first embodiment, the control function 11$a$ obtains the first medical image (current image) and the second medical image (past image) collected from the object. The identification function 11$c$ identifies a plurality of sites of the object included in the first medical image. The subtraction image generation function 11$d$ calculates, for each of a plurality of pixels forming the first medical image, the subtraction value with respect to a pixel, corresponding to the pixel, on the second medical image by a subtraction generation method corresponding to the site, thereby generating a subtraction image between the first medical image and the second medical image. Therefore, the image processing apparatus 10 according to the first embodiment can execute subtraction processing by a subtraction method suitable for each site, and can generate, even if an image includes a plurality of sites of interest, a subtraction image suitable for observing the plurality of sites of interest. That is, the image processing apparatus 10 receives medical images, identifies a plurality of sites included in the current image, and applies a subtraction generation method corresponding to each site, thereby making it possible to generate a subtraction image between the current image and the past image, which is suitable for observing the plurality of sites of interest.

According to the first embodiment, the identification function 11$c$ identifies a site in which at least one of the composition and pixel value range is different. Therefore, the image processing apparatus 10 according to the first embodiment can appropriately identify a site in the medical image.

According to the first embodiment, the subtraction image generation function 11$d$ generates a subtraction image by applying, in accordance with the site, the first subtraction generation method formed from subtraction processing or the second subtraction generation method formed from subtraction processing in which the degree of at least one of noise reduction processing and emphasis processing is higher than that of the first subtraction generation method. Therefore, the image processing apparatus 10 according to the first embodiment can perform subtraction processing corresponding to the site or the characteristic of a lesion on the image, thereby making it possible to generate a subtraction image in which a site of interest can be observed appropriately.

According to the first embodiment, the subtraction image generation function 11$d$ applies the first subtraction generation method to a pixel corresponding to the inside of the spinal canal, and applies the second subtraction generation method to a pixel corresponding to the outside of the spinal canal. According to the first embodiment, the first subtraction generation method is simple subtraction processing between a pixel value of the first medical image and a pixel value of the second medical image, and the second subtraction generation method is subtraction processing including at least one of noise reduction processing and emphasis processing. Therefore, the image processing apparatus 10 according to the first embodiment can generate a subtraction image in which invasion of the spinal canal is visualized and a lesion outside the spinal canal is visualized.

According to the first embodiment, the subtraction image generation unit applies the first subtraction generation method to a pixel corresponding to the vertebra region excluding the inside of the spinal canal or the peripheral region of the vertebra, and applies the second subtraction generation method to a pixel outside the vertebra region including the inside of the spinal canal and the peripheral region of the vertebra. According to the first embodiment, the first subtraction generation method is subtraction processing including high density emphasis processing of attenuating a subtraction value of a relatively low pixel value region, and the second subtraction generation method is subtraction processing including high density emphasis processing of strengthening the degree of attenuating the subtraction value, as compared with the first subtraction generation method. Therefore, the image processing apparatus 10 according to the first embodiment can visualize an extraosseous mass in a vertebra or a site close to the vertebra, and visualize bone metastasis in a remaining region away from the vertebra.

Second Embodiment

As another embodiment of the present invention, a mode is considered in which a plurality of partial subtraction images corresponding to respective sites are generated by subtraction generation methods suitable for the respective sites based on the identification results of the sites, respectively, and the partial subtraction images are finally integrated to generate an integrated subtraction image. These partial subtraction images can be generated simultaneously, which is useful to improve the throughput of the overall processing.

Note that the second embodiment is different from the first embodiment in terms of processing contents by a subtraction image generation function 11$d$. More specifically, the subtraction image generation function 11$d$ according to the second embodiment generates, based on the identification results of a plurality of sites, a plurality of partial images corresponding to the sites from the first medical image. The subtraction image generation function 11$d$ generates a plurality of partial subtraction images by applying, to each of the plurality of partial images, a subtraction generation method corresponding to each site, and integrates the plurality of partial subtraction images, thereby generating a subtraction image. These will mainly be described below.

FIG. 7 is a flowchart illustrating all processes of an image processing apparatus 10 according to the second embodiment. Processes indicated by a dotted-line frame 20 in FIG. 7 are the same as those in steps S101 to S104 of FIG. 2. Processes in step S205 to S213 shown in FIG. 7 are implemented when, for example, a processing circuit 11 calls a program corresponding to the subtraction image generation function 11$d$ from a storage circuit 13, and executes it. If sites of interest are identified, similar to step S104, the image processing apparatus 10 generates a plurality of partial subtraction images by different subtraction generation methods. That is, the subtraction image generation function 11$d$ generates a plurality of partial subtraction images each formed by at least partially including different pixel values. Note that in this embodiment, one partial subtraction image is generated for the inside of the site of interest (spinal canal) and two partial subtraction images are generated for the outside of the site of interest (spinal canal).

As shown in FIG. 7, if a site of interest is identified, the subtraction image generation function 11$d$ generates an image 12' for the inside of the site of interest (spinal canal) by deforming a past image 12 based on a correspondence V and registering it with a current image I1 (step S205).

Next, the subtraction image generation function 11$d$ calculates a simple subtraction value "I1(P)-I2'(P)" for a pixel P in the site of interest (spinal canal) and sets it as a pixel value S1(P) of a partial subtraction image S1 (steps S206 and S207).

Next, for each of all the pixels P outside the site of interest (spinal canal), the subtraction image generation function 11$d$ calculates a subtraction value after noise removal between the pixel P and a pixel P' for the outside of the site of interest (spinal canal). At this time, the subtraction image generation function 11$d$ generates two partial subtraction images by performing weak high density emphasis processing and strong high density emphasis processing for the subtraction values after noise removal.

For example, as shown in FIG. 7, the subtraction image generation function 11$d$ sets, as a pixel value S2(P) of a partial subtraction image S2, a value obtained by performing weak high density emphasis processing for the subtraction value after noise removal (steps S208 and S209). The subtraction image generation function 11$d$ sets, as a pixel value S3(P) of a partial subtraction image S3, a value obtained by performing strong high density emphasis processing for the subtraction value after noise removal (steps S210 and S211).

Next, the subtraction image generation function 11$d$ blends the partial subtraction images S2 and S3 by setting a boundary R between the periphery of the vertebra and the remaining region. That is, the subtraction image generation function 11$d$ generates a subtraction image by smoothly combining the images S2 and S3 so that the image S2 corresponds to the inside of the boundary R and the image S3 corresponds to the outside of the boundary R. Furthermore, the subtraction image generation function 11$d$ generates an integrated subtraction image C by fitting the partial subtraction image S1 in a portion of the site of interest (spinal canal) of the combined subtraction image (step S212).

Next, the subtraction image generation function 11$d$ outputs the integrated subtraction image C (step S213). Note that this processing is the same as that in step S109 of FIG. 2.

As described above, according to the second embodiment, based on the identification results of a plurality of sites, the subtraction image generation function 11$d$ generates a plurality of partial images corresponding to the sites from the first medical image. The subtraction image generation function 11$d$ generates a plurality of partial subtraction images by applying, to each of the plurality of partial images, a subtraction generation method corresponding to each site, and integrates the plurality of partial subtraction images, thereby generating a subtraction image. Therefore, the image processing apparatus 10 according to the second embodiment can efficiently generate a subtraction image between the current image and the past image, which is suitable for observing the plurality of sites of interest.

Furthermore, according to the second embodiment, each of the plurality of partial subtraction images partially includes different pixel values. Therefore, the image processing apparatus 10 according to the second embodiment can generate a subtraction image by combining different partial subtraction images.

Third Embodiment

As another embodiment of the present invention, an embodiment is considered in which a given threshold is set for a specific site in an integrated subtraction image C and a binary subtraction image is generated by collecting pixels having values equal to or larger than the threshold. FIG. 8 is a block diagram showing an example of the arrangement of an image processing apparatus 10$a$ according to the third embodiment. The image processing apparatus 10$a$ is different from the image processing apparatus according to the first or second embodiment in terms of processing contents by a subtraction image generation function 11$d$ and a processing circuit 111 executing a fusion image generation function 11$e$. These will mainly be described below.

The subtraction image generation function 11$d$ according to the third embodiment generates a binary subtraction image by binarizing the subtraction value of a pixel in accordance with a site. More specifically, the subtraction image generation function 11$d$ generates a binary subtraction image by binarizing the subtraction value of a pixel for each site based on the threshold set for each site.

The fusion image generation function 11$e$ generates a fusion image by superimposing the binary subtraction image on a subtraction image, a first medical image, or a second medical image. Note that the fusion image generation function 11$e$ is an example of a fusion image generation unit.

FIG. 9 is a flowchart illustrating all processes of the image processing apparatus 10$a$ according to the third embodiment. Processing indicated by a dotted-line frame 30 in FIG. 9 is processing of generating an integrated subtraction image, and is the same processing as that in the first or second embodiment.

As shown in FIG. 9, if the integrated subtraction image C is generated, the subtraction image generation function 11$d$ determines, for each pixel P forming the integrated subtraction image C, whether the pixel P is in a site of interest (spinal canal) (step S302), and executes processing in step S303 or S304 in accordance with a determination result (step S301). This processing is implemented when, for example, the processing circuit 111 calls a program corresponding to the subtraction image generation function 11$d$ from a storage circuit 13 and executes it.

For example, if the pixel P exists in the site of interest (spinal canal) (YES in step S302), the subtraction image generation function 11$d$ compares a subtraction pixel value C(P) with a predetermined threshold T1. If the subtraction pixel value C(P) is larger than the threshold T1, the subtraction image generation function lid sets a pixel value B1(P) of a binary subtraction image B1 to a predetermined value (step S303).

On the other hand, if the pixel P exists outside the site of interest (spinal canal) (NO in step S302), the subtraction image generation function 11$d$ determines whether the pixel P exists outside the site of interest (vertebra) and inside the boundary R (that is, on a periphery 33 of the vertebra). If the pixel P exists on the periphery 33 of the vertebra, the subtraction image generation function 11$d$ compares the subtraction pixel value C(P) with a predetermined threshold T2. If the subtraction pixel value C(P) is larger than the threshold T2, the subtraction image generation function 11$d$ sets a pixel value B2(P) of a binary subtraction image B2 to a predetermined value (step S304).

Next, the fusion image generation function 11$e$ generates a fusion image F by superimposing the binary subtraction images B1 and B2 on the integrated subtraction image C or a current image I1 with predetermined colors (step S305). At the time of superimposing the images, the color corresponding to the image B1 and the color corresponding to the image B2 may be changed. This processing is implemented when, for example, the processing circuit 111 calls a program corresponding to the fusion image generation function 11$e$ from the storage circuit 13 and executes it.

Next, the fusion image generation function 11$e$ outputs the fusion image F (step S306). For example, the fusion image generation function 11$e$ outputs the fusion image F to the storage circuit 13 or an apparatus on a network. This processing is implemented when, for example, the processing circuit 111 calls the program corresponding to the fusion image generation function 11$e$ from the storage circuit 13 and executes it.

(Generation Processing of Binary Subtraction Image)

As described above with reference to steps S301 to S304 of FIG. 9, the subtraction image generation function 11$d$ compares a subtraction pixel value in the integrated subtraction image with the predetermined threshold for each site, and sets, to a predetermined value (for example, 1), a pixel indicating a value larger than the threshold, thereby generating a binary subtraction image. That is, the subtraction image generation function 11$d$ generates, for each site, a binary subtraction image indicating a position at which an abnormality is suspected.

The threshold set for each site may be set based on the relationship between a subtraction value and a lesion as a diagnosis target. For example, the threshold T1 to be compared with the subtraction pixel value C(P) in the spinal canal may be set based on the relationship between a subtraction value and tumor invasion of the spinal canal. This allows the subtraction image generation function 11$d$ to indicate, by a binary subtraction image, a position at which tumor invasion of the spinal canal is suspected.

The threshold T2 to be compared with the subtraction pixel value C(P) on the periphery of the vertebra may be set based on the relationship between an extraosseous mass and a subtraction value. This allows the subtraction image generation function 11$d$ to indicate, by a binary subtraction image, a position at which an extraosseous mass is suspected.

(Generation Processing of Fusion Image)

As described above with reference to step S305 of FIG. 9, the fusion image generation function 11$e$ generates the fusion image F by superimposing the binary subtraction images B1 and B2 on the integrated subtraction image C or the current image I1. The fusion image generation function 11$e$ can generate the fusion image F in which a position at which an abnormality is suspected in the spinal canal and the periphery of the vertebra is readily observed, by applying different colors to the predetermined values of the binary subtraction images B1 and B2. Note that the fusion image generation function 11*e* can also generate the fusion image F by superimposing the binary subtraction images B1 and B2 on a past image 12.

As described above, if the fusion image generation function 11*e* generates the fusion image F, it outputs the generated fusion image F to the storage circuit 13 or another apparatus on the network. Note that the fusion image generation function 11*e* can implement transmission of the fusion image F to the PACS using the DICOM protocol. Furthermore, the control function 11*a* can display the generated fusion image F on a display 14.

As described above, according to the third embodiment, the subtraction image generation function 11*d* generates a binary subtraction image by binarizing a subtraction value of a pixel in accordance with a site. Therefore, the image processing apparatus 10*a* according to the third embodiment can indicate, for each site, a position at which an abnormality is suspected.

According to the third embodiment, the fusion image generation function 11*e* generates a fusion image by superimposing the binary subtraction image on the subtraction image, the first medical image, or the second medical image. Therefore, the image processing apparatus 10*a* according to the third embodiment can generate an image that implements easy diagnosis.

As described above, the image processing apparatus 10*a* according to this embodiment can be used to receive medical images, identify the plurality of sites included in the current image, and apply subtraction emphasis methods corresponding to the respective sites, thereby efficiently generating a fusion image suitable for observing the plurality of sites of interest.

OTHER EMBODIMENTS

In the above-described embodiments, a spinal canal site and a vertebra site are set as site identification targets but a site identification target is not limited to them. For example, a lung site and a rib site may be set as site identification targets and a subtraction method corresponding to the site to which each pixel belongs may be applied, thereby generating a subtraction image. In this case, an input image is often under a lung field condition, the first subtraction generation method applied to the lung site is preferably simple subtraction processing after application of a median filter. The second subtraction generation method applied to the rib site is preferably subtraction processing that reduces noise caused by the partial volume effect after application of a median filter.

The embodiments have been described in detail but the present invention can take an embodiment as a system, an apparatus, a method, a program, or a recording medium (storage medium). More specifically, the present invention may be applied to a system formed by a plurality of devices (for example, a host computer, an interface device, an image capturing apparatus, a Web application, and the like) or an apparatus formed by a single device.

The term "processor" used in the above description of the embodiments means, for example, a circuit such as a Central Processing Unit (CPU), a Graphics Processing Unit (GPU), an Application Specific Integrated Circuit (ASIC), or a programmable logic device (for example, a Simple Programmable Logic Device (SPLD), a Complex Programmable Logic Device (CPLD), or a Field Programmable Gate Array (FPGA)). Instead of storing the programs in the storage circuit, the programs may directly be incorporated in the circuit of the processor. In this case, the processor reads out the programs incorporated in the circuit and executes them, thereby implementing the functions. Each processor according to each embodiment need not necessarily be configured as a single circuit for each processor. Instead, one processor may be formed by combining a plurality of independent circuits to implement the functions.

The image processing program executed by the processor is incorporated in advance in a Read Only Memory (ROM), a storage circuit, or the like and provided. Note that the image processing program may be recorded, in a format installable in the apparatus or the form of a file executable by the apparatus, in a non-transitory computer-readable storage medium such as a Compact Disk (CD)-ROM, a Flexible Disk (FD), a CD-Recordable (R), or a Digital Versatile Disk (DVD), and provided. The image processing program may be stored in a computer connected to a network such as the Internet, and downloaded via the network to be provided or distributed. For example, the image processing program is formed by modules respectively having the above-described processing functions. As actual hardware, the CPU reads out a medical information processing program from the storage medium such as a ROM and executes it, and thus each module is loaded into the main storage device and generated in the main storage device.

In the above-described embodiments, the constituent elements of each apparatus shown in the drawings are functional and conceptual, and need not always physically be configured as shown in the drawings. That is, the detailed form of distribution/integration of the apparatuses is not limited to that illustrated, and all or some of the apparatuses can be distributed/integrated functionally or physically in an arbitrary unit in accordance with various kinds of loads and use conditions. Furthermore, all or some arbitrary processing functions performed in each apparatus can be implemented by a CPU and programs analyzed and executed by the CPU, or can be implemented as hardware by a wired logic.

Among the processes described in the above embodiments and modifications, all or some of the processes described as those performed automatically can be executed manually or all or some of the processes described as those performed manually may be executed automatically by a known method. In addition, the processing procedures, control procedures, detailed names, and information including various data and parameters described in this specification and drawings can arbitrarily be changed unless otherwise specified.

According to at least one of the above-described embodiments, even if an image includes a plurality of sites of interest, it is possible to generate a subtraction image suitable for observing the plurality of sites of interest.

Several embodiments have been described above. These embodiments are merely examples and are not intended to limit the scope of the present invention. These embodiments can be executed in various other forms, and various omissions, replacements, and changes can be made without departing from the scope of the present invention. These embodiments and modifications are incorporated in the scope of the present invention, and are also incorporated in the invention described in the claims and their equivalents.

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-033246, filed Mar. 4, 2022, which is hereby incorporated by reference herein in its entirety.

What is claimed is:

1. An image processing apparatus comprising:
a processor; and
a memory including instructions, which when executed by the processor, cause the image processing apparatus to perform operations comprising:
obtaining a first medical image and a second medical image collected from an object;
executing registration processing between the first medical image and the second medical image and obtain registered first and second medical images;
storing a pair of programs in association with a first subtraction generation method and a second subtraction generation method in which a degree of at least one of noise reduction processing for reduction of an artifact caused by a partial volume effect and emphasis processing is higher than that of the first subtraction generation method in the memory;
identifying a plurality of anatomical sites of interest within the object included in the first medical image; and
generating a subtraction image between the registered first and second medical images by calculating, for each of a plurality of pixels forming the registered first and second medical images, a subtraction value with respect to a pixel, corresponding to the pixel, on the second medical image by a selected, on a per-pixel basis, subtraction generation method out of the first subtraction generation method and the second subtraction generation method in association with the pair of programs stored in the memory based on the anatomical site identified,
wherein generating the subtraction image between the registered first and second medical images includes:
generating a plurality of partial images respectively corresponding to anatomical sites from the first medical image based on identification results of the plurality of anatomical sites;
generating a plurality of partial subtraction images by applying, to each of the plurality of partial images, a subtraction generation method corresponding to each anatomical site of the anatomical sites; and
generating the subtraction image by integrating the plurality of partial subtraction images.

2. The apparatus according to to claim 1, wherein each of the plurality of partial subtraction images partially includes different pixel values.

3. The apparatus according to claim 1, wherein the first subtraction generation method is applied to a pixel corresponding to an inside of a spinal canal, and the second subtraction generation method is applied to a pixel corresponding to an outside of the spinal canal.

4. The apparatus according to claim 3, wherein
the first subtraction generation method is simple subtraction processing between a pixel value of the first medical image and a pixel value of the second medical image.

5. The apparatus according to claim 1, wherein the first subtraction generation method is applied to a pixel corresponding to a vertebra region excluding an inside of a spinal canal or a peripheral region of the vertebra region, and the second subtraction generation method is applied to a pixel outside corresponding to a vertebra region including the inside of the spinal canal or the peripheral region of the vertebra region.

6. The apparatus according to claim 5, wherein
the first subtraction generation method is subtraction processing including high density emphasis processing of attenuating a subtraction value of a relative low pixel value region, and
the second subtraction generation method is subtraction processing including high density emphasis processing of strengthening a degree of attenuating the subtraction value, as compared with the first subtraction generation method.

7. The apparatus according to claim 1, wherein generating the subtraction image between the registered first and second medical images includes generating a binary subtraction image by binarizing a subtraction value of a pixel in accordance with the anatomical site.

8. The apparatus according to claim 7, further comprising:
generating a fusion image by superimposing the binary subtraction image on one of the subtraction image, the first medical image, or the second medical image.

9. An image processing method comprising:
obtaining a first medical image and a second medical image collected from an object;
identifying a plurality of anatomical sites of interest within the object included in the first medical image;
executing registration processing between the first medical image and the second medical image and obtaining registered first and second medical images;
reading out a selected one of a pair of programs stored in a memory in association with a first subtraction generation method and a second subtraction generation method in which a degree of at least one of noise reduction processing for reduction of an artifact caused by a partial volume effect and emphasis processing is higher than that of the first subtraction generation method; and generating a subtraction image between the registered first and second medical images and the second medical image by calculating, for each of a plurality of pixels forming the first medical image, a subtraction value with respect to a pixel, corresponding to the pixel, on the second medical image by a selected, on a per-pixel basis, subtraction generation method out of the first subtraction generation method and the second subtraction generation method in association with the pair of programs stored in the memory based on the anatomical site identified in a step of the identifying, wherein generating the subtraction image between the registered first and second medical images includes:

generating a plurality of partial images respectively corresponding to anatomical sites from the first medical image based on identification results of the plurality of anatomical sites;

generating a plurality of partial subtraction images by applying, to each of the plurality of partial images, a subtraction generation method corresponding to each anatomical site of the anatomical sites; and generating the subtraction image by integrating the plurality of partial subtraction images.

10. A non-transitory storage medium storing an image processing program for causing a computer to execute an image processing method according to claim 9.

\*  \*  \*  \*  \*